United States Patent Office 3,233,488
Patented Feb. 8, 1966

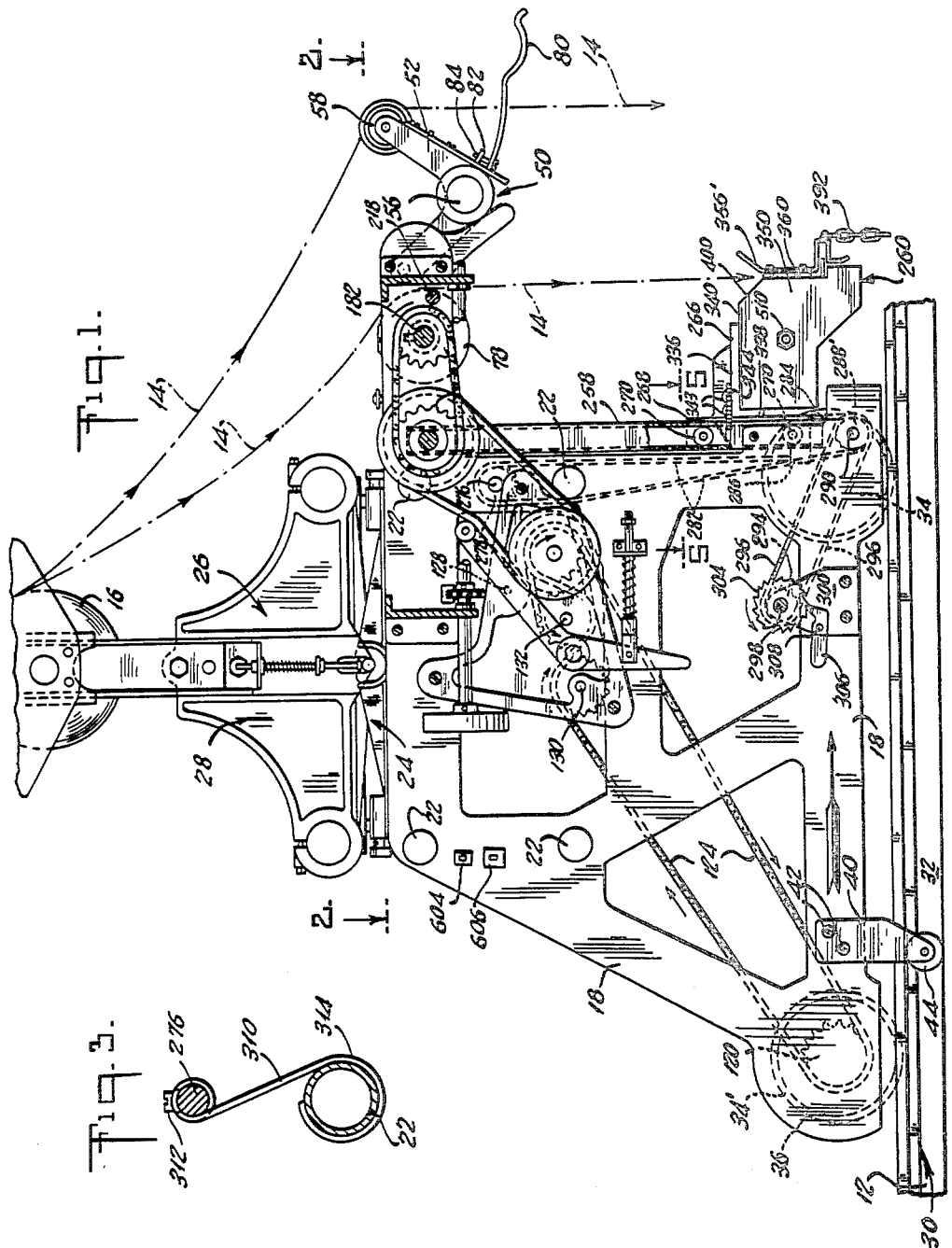

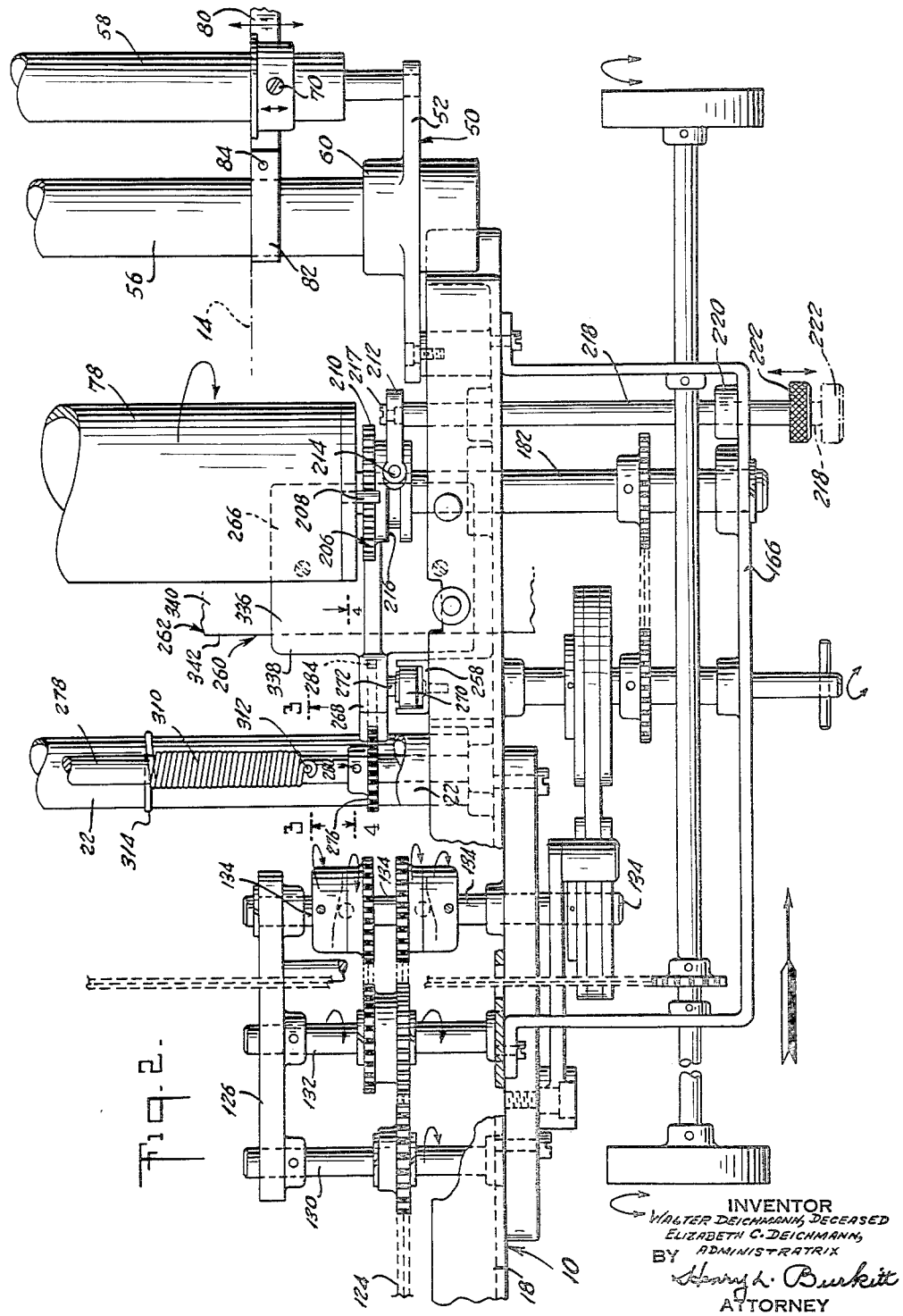

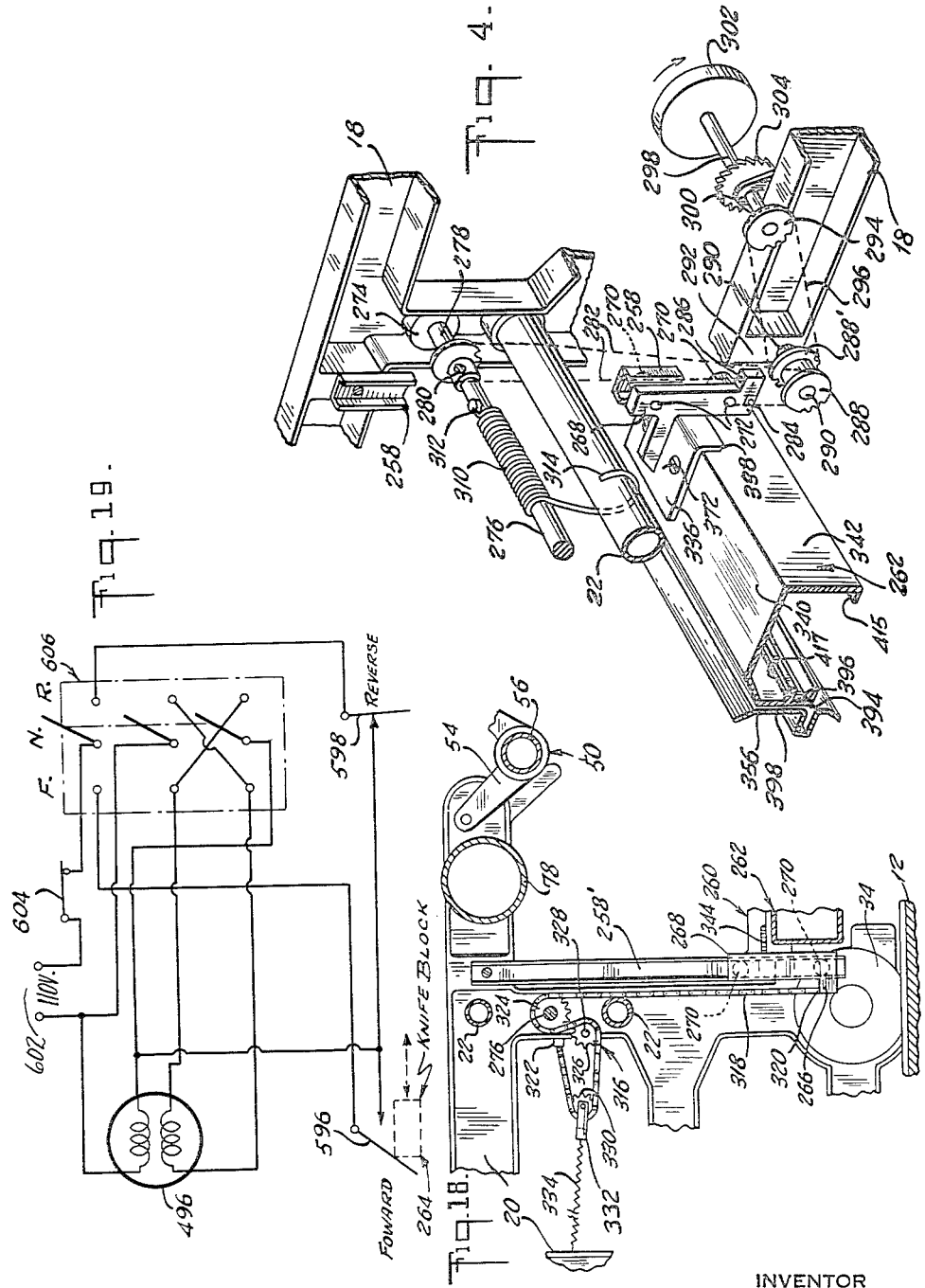

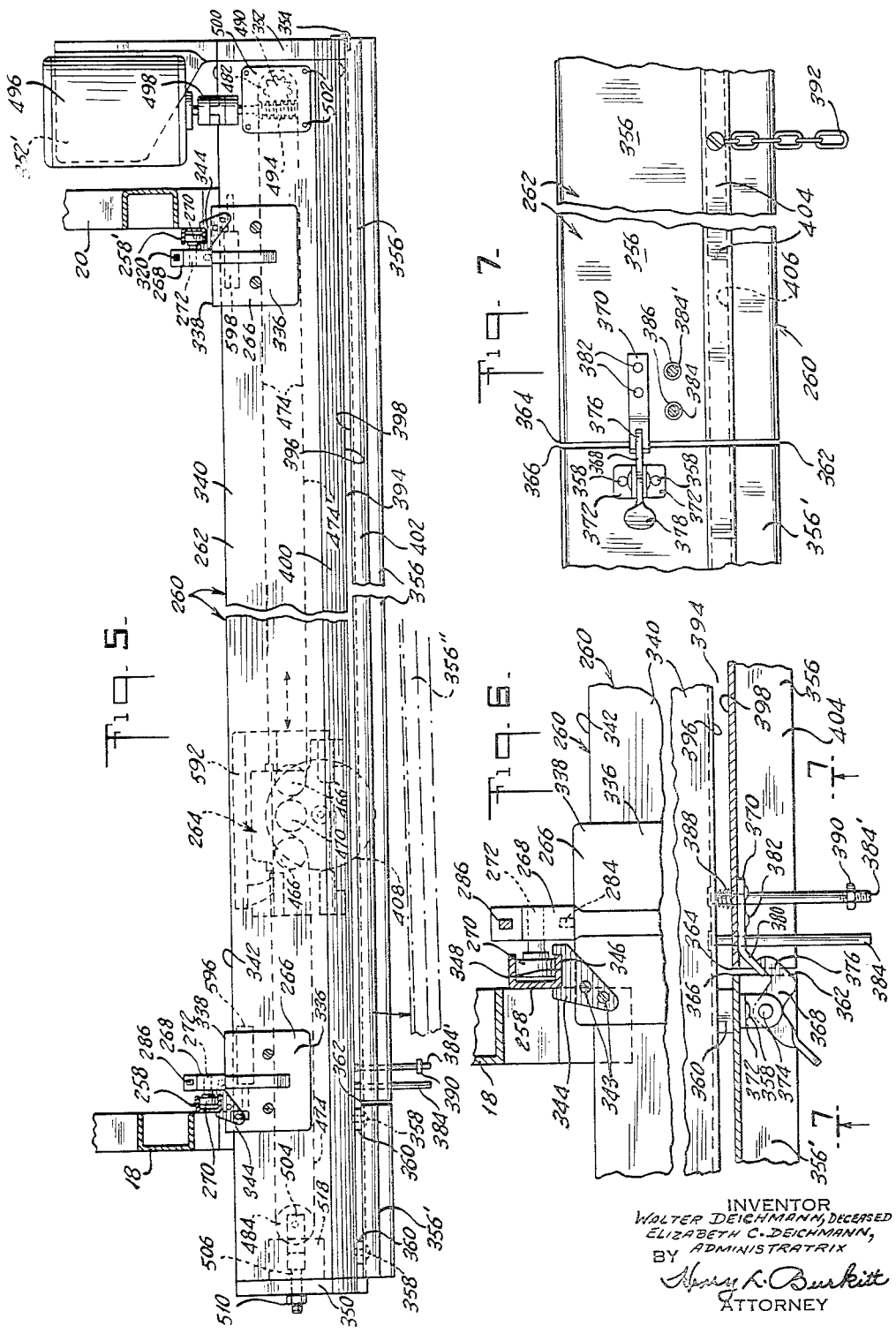

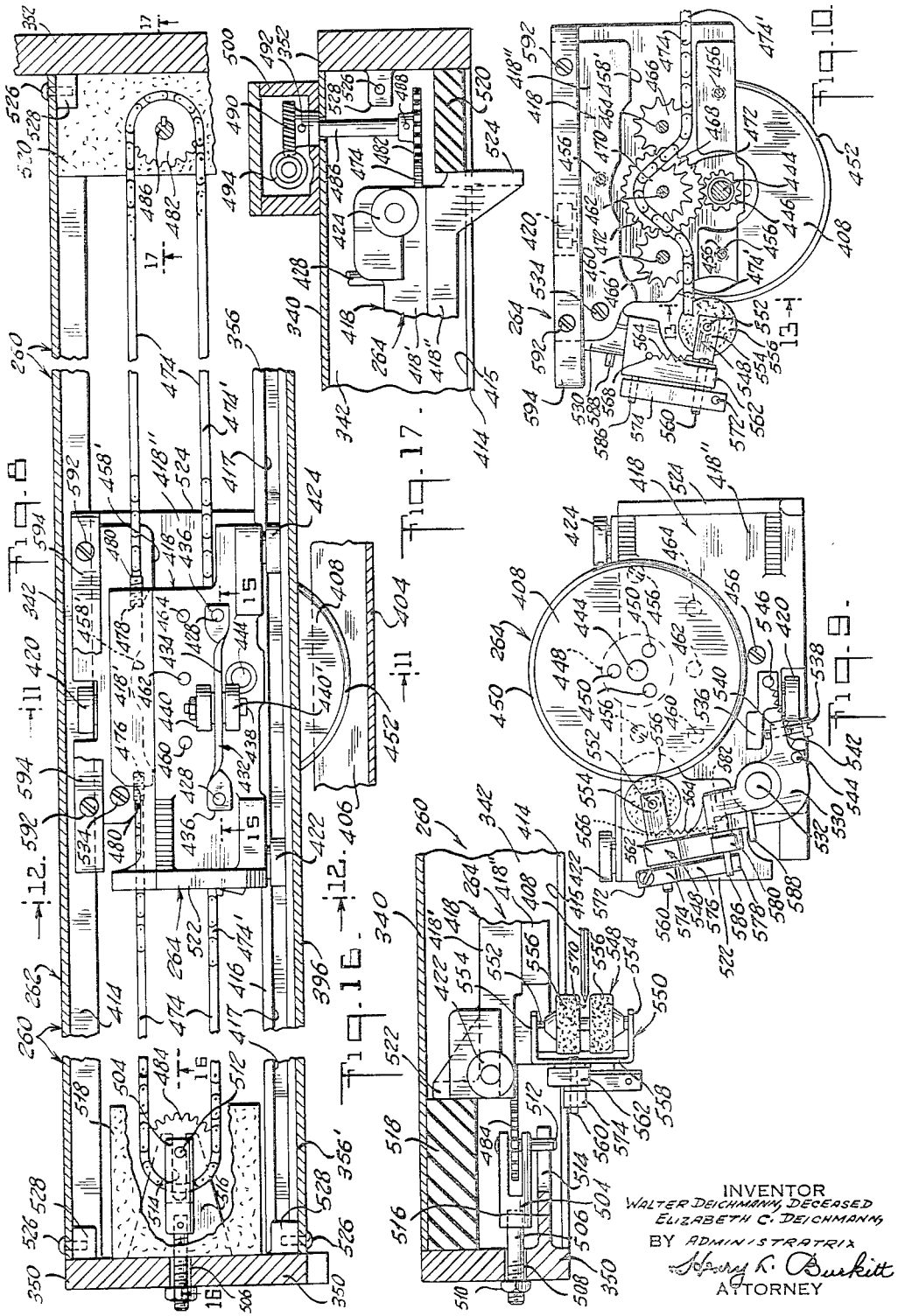

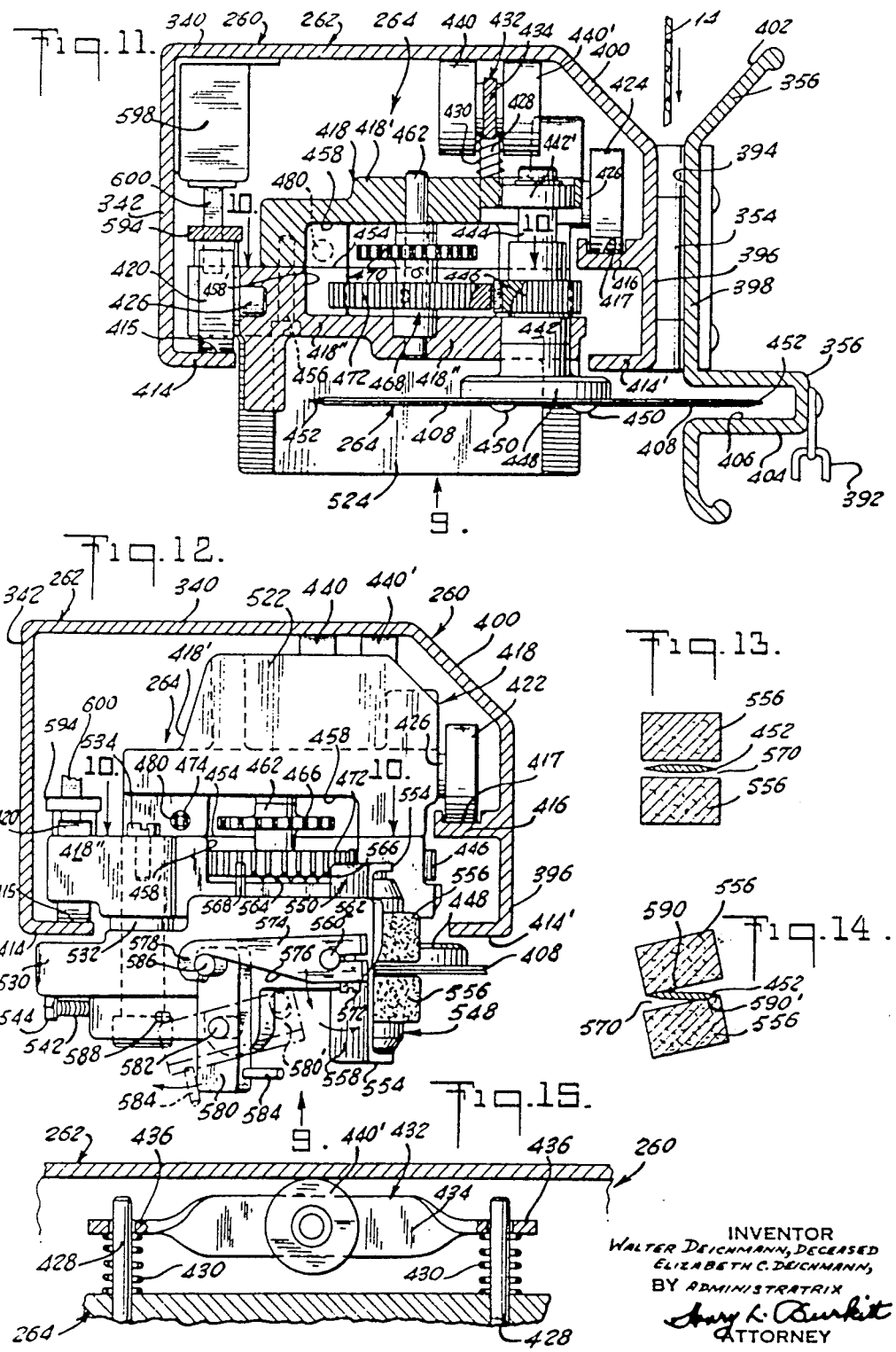

3,233,488
TURNTABLE CUTTING MACHINES
Walter Deichmann, deceased, late of Nassau County,
N.Y., by Elizabeth C. Deichmann, administratrix,
Mineola, N.Y., assignor to Cutting Room Appliances
Corp., New York, N.Y., a corporation of New York
Original application Nov. 26, 1958, Ser. No. 776,645, now
Patent No. 3,094,319, dated June 18, 1963. Divided
and this application May 13, 1963, Ser. No. 280,164
15 Claims. (Cl. 83—174)

This invention relates generally to cutting mechanism for spreading machines of the turntable type.

In application, Serial No. 776,645, filed November 26, 1958, now Patent No. 3,094,319, of which this application is a division, entitled "Spreading Machines of the Turntable Type Having Cutting Apparatus," there is disclosed a turntable spreading machine with a swiveling carrier for the sheet material and the cutting mechanism here to be set forth and claimed. The invention relates to an improved spreading machine of this general character having such "turntable," in which novel features and improvements are provided including cutting apparatus for severing each layer subsequent to the spreading thereof.

An object of the invention is the provision, in a spreading machine, of a reciprocable cutter adapted for rotation concomitant with the reciprocation thereof, there being improved simple and positive operating mechanism provided to impart concomitant reciprocation and high speed rotation of the sheet material or cloth cutting disc.

A single stroke of travel of the cutter assembly in either direction along the line of the cutter provides a fabric cutting operation. Another object of the invention is the provision of improved means for reversing the path of travel of the cutter assembly at the terminus of each cutting stroke.

A feature of such cutter assembly is the provision of selective means for dressing or buffering the cloth cutting disc during the operation thereof.

One of the major problems associated with the provision of automatic cutting apparatus in a spreading machine relates to the mounting or suspension of the cutter assembly for reciprocation. As the load constituted by the cutter assembly travels along its support, there is introduced the problem of flexure of the support as such assembly travels therealong, and attendant improper results in the cutting action. Another object of the invention is the provision of an improved suspension arrangement for the cutter assembly in which the aforenoted problem is obviated and in which the support is rigidified against distortion consistent with lightness of weight, simplicity of construction and ease of fabrication.

Other objects of the invention will be set forth hereinafter, or will be apparent from the description and the drawings, in which embodiments are illustrated to exemplify the invention.

The invention, however, is not intended to be restricted to any particular construction, or any particular arrangement of parts, or any particular application of any such construction or arrangement of parts, or any specific method of operation or use, or any of the various details thereof, even where specifically shown and described herein, as the same may be modified in various particulars, or may be applied in many varied relations, without departing from the spirit and scope of the claimed invention, of which the exemplifying embodiments, herein shown and described, are intended only to be illustrative, and only for the purpose of complying with the requirements of the Statutes for disclosure of operative embodiments, but not to show all the various forms of modifications in which the invention might be embodied.

In the drawings, in which the same reference characters refer to the same parts throughout and in which is disclosed such practical construction:

FIG. 1 is a side elevational view showing a spreading machine according to the invention mounted upon a table, with the swingable frame constituting a drive roll wrap-around provision shown in an open threading position, and with a cutter assembly in position to cooperate with the fabric being fed, said view looking from the operating side of the machine;

FIG. 2 is a sectional view, on an enlarged scale, taken on the line 2—2 of FIG. 1 with part broken away to reveal structural details;

FIG. 3 is a sectional view taken on the line 3—3 of FIG. 2, showing a detail of the cutter box counter balance;

FIG. 4 is a perspective view showing the mechanism for elevating the cutter box at one side thereof, said view being taken on the line 4—4 of FIG. 2;

FIG. 5 is a top plan view of the cutter box, said view being taken on the line 5—5 of FIG. 1;

FIG. 6 is an enlarged fragmentary view of the lefthand end region of FIG. 5;

FIG. 7 is a fragmentary front elevational view of the cutter box in the region of the door latch, taken on the line 7—7 of FIG. 6;

FIG. 8 is an enlarged fragmentary horizontal scetional view of the cutter box, the latter being shown in plan;

FIG. 9 is a bottom plan view of the cutter assembly looking in the direction of arrow 9 of FIGS. 11 and 12;

FIG. 10 is a plan view of the cutter assembly, taken on the line 10—10 of FIGS. 11 and 12;

FIG. 11 is a transverse sectional view through the cutter box and cutter assembly, taken on the line 11—11 of FIG. 8;

FIG. 12 is a side elevational view of the cutter assembly, taken on the line 12—12 of FIG. 8;

FIG. 13 is an enlarged fragmentary sectional view showing the buffering wheels in association with the cutting disc with said wheels being in non-operating position, said view being taken on the line 13—13 of FIG. 10;

FIG. 14 is a view similar to FIG. 13 showing the buffering wheels in operative association with the cutting disc;

FIG. 15 is an enlarged sectional view of a portion of the cutter assembly, taken on the line 15—15 of FIG. 8;

FIG. 16 is a sectional view taken on the line 16—16 of FIG. 8;

FIG. 17 is a sectional view taken on the line 17—17 of FIG. 8;

FIG. 18 is a view companion to FIG. 4 showing a fragmentary side elevational view of the cutter box elevating mechanism at the side opposite to that shown in FIG. 4; and FIG. 19 is a wiring diagram of the cutter assembly motor and control circuit.

Referring to the drawings, and more particularly to FIGS. 1 and 2 thereof, there is shown a spreading machine 10 mounted to move along a table 12 to spread layers of sheet material 14, such as fabric from a roll 16 of such material. The machine 10 comprises a pair of laterally spaced end frames 18 and 20 which are rigidly interconected in this spaced relation by the tubular cross members 22 to define the carriage of the machine. Riding on the upper pair of members 22 is a carrier 24 upon which is pivoted a spreader 26, the latter having mounted thereon the cloth carrying means 28 for supporting roll 16. The carrier 24 and structure superposed thereon and carried thereby is similar to the corresponding structure of the aforereferred to application, Serial No. 776,645, and reference is made to said application for a detailed description of such structure.

In order to properly guide machine 10 for movement longitudinally of the table, tracks 30 are secured to the opposite edges 32 of the table. Upon these tracks roll wheels 34 suitably mounted for rotation with respect to the frames 18 and 20, each wheel being provided with a groove 36 which interfits with the flange 38 of the track to thereby guide the machine in its travel over the table. If desired, the machine may be positively guided in this manner at frame 18 only, with the other side being provided with treaded wheels which roll directly upon the top face of the table. In order to prevent the machine from tipping under load or stress during its operation, each frame is provided with a retaining bracket 40 (FIG. 1) secured thereto by bolts 42, the bracket carrying a roller 44 which engages the underside of the track to thereby prevent vertical displacement of the machine with respect to the table.

In order to properly guide and feed the fabric to the table, there is provided a swingable frame 50 comprising an opposite pair of L-shaped end frames 52 and 54 (FIGS. 1, 2, and 18) which mount a tubular tie rod 56 and roll 58. Roll 58 has adjustably mounted thereon a pair of edge guides for guiding the opposite edges of the traveling fabric, all of which is more fully described in said application, Serial No. 776,645. The frame 50 is mounted for swingable movement about a pivot axis, and is pivotally movable between the open or fabric threading position shown in FIGS. 1 and 2, and the closed operating or feeding position in which is achieved the desired wrap-around of the fabric with respect to the feed roll 78 which is positively driven on movement of the machine along the table. Mounted on the tie rod 56 is a side edge guide 80 for the fabric, said guide having a mounting part 82 which encircles the tie rod and which is releasably clamped thereto by bolt 84.

The frame 50 is releasably latched in the closed operating position by the complementary pair of releasably interengageable latch parts.

On the movement of the machine along the table the feed roll 78 is positively driven, the direction of rotation of the feed roll being the same independent of the direction of movement of the machine along the table. One wheel 34' (FIG. 1) has a sprocket 120 keyed thereto for rotation therewith, said sprocket driving chain 124. Laterally spaced from frame 18 is a mounting plate 126 which is rigidly interconnected with said frame by shafts 128, 130, and 132, a rotatable shaft 134 extending between said frame and the mounting plate (FIGS. 1 and 2). Shaft 134, by means of overrunning clutches, sprockets and chains, effects constant rotation of roll 78 in one direction as the machine moves back and forth over the table. That structure has been described more fully in said application, Serial No. 776,645.

Means are provided for disengaging the drive between shaft 134 and roll 78 when it is desired to thread the fabric past feed roll 78. For this purpose, a drive pin 208, which is part of the drive mechanism, intengages in any one of the teeth 210 of the sprocket 206 to provide driving engagement between shaft 182 and the feed roll, said sprocket being shiftable to disengage pin 208 from the sprocket and release the feed roll for free wheeling. The shifting of the sprocket with respect to the feed roll is controlled by the C-shaped yoke 212 having diametrically opposed pins 214 which ride freely in peripheral groove 216 of sprocket 206. Secured to yoke 212 at 217 and extending laterally from said yoke is a control shaft 218, which extends to the outer side of plate 166 through socket 220 thereof, said shaft having a knurled knob 222 suitably affixed to the outer end thereof. In the solid line position of said knob, as shown in FIG. 2, the feed roll will be in driving engagement with shaft 182 and on manipulating said knob to the broken line "out" position the yoke 212 will be removed concomitantly to shift sprocket 206 to disengage the same from pin 208 and thereby disconnect the feed roll from driving engagement with shaft 182. The feed roll will normally be in driving engagement with shaft 182 and will thus be positively driven on the movement of the machine along the table, except during the threading operation when the feed roll will be disengaged from said shaft.

Suitably bolted or otherwise secured to frames 18 and 20 are a pair of vertically disposed and transversely aligned U-shaped channel members 258, 258' which define tracks for the vertical movement of the cloth cutting device generally designated by the numeral 260. The cutting device 260 comprises a horizontally disposed longitudinally extending cutter box 262 which mounts the cutter assembly 264 for reciprocation in a horizontal plane and transversely of the table. Suitably affixed to each end of cutter box 262 is a generally L-shaped mounting bracket 266 having an upright post 268 mounting a pair of vertically spaced rollers 270 which ride in companion channel members 258, 258'. The rollers 270 are mounted for rotation on companion stub shafts 272.

The manner of raising and lowering the cutter box will now be described. Journalled for rotation in sockets 274 provided in the end frames is a shaft 276 having a sprocket 278 keyed thereto as indicated at 280 (see FIG. 4), there being a chain 282 trained thereover with the end of the chain anchored to post 268 at anchor points 284 and 286. The chain 282 at the bottom is trained over sprocket 288 288', the dual sprocket being mounted for rotation on stub shaft 290 carried by the rib part 292 of frame 18. Trained over sprockets 288' and 294 is a chain 296, the sprocket 294 being fixed to shaft 298 which is rotatably carried in bracket 300 mounted to the frame 18. A hand wheel 302 is fixed to the outer end of shaft 298 to facilitate the rotation of said shaft and achieve the desired vertical adjustment of the cutter box. A ratchet wheel 304 is suitably secured to shaft 298 for coaction with the pawl 306 pivoted on bracket 300 as indicated at 308 (FIG. 1). The hand wheel 302 is rotated in the direction of the arrows shown in FIGS. 1 and 4 to raise the cutter box; on such raising the pawl will ratchet over the ratchet wheel and clutch the latter in position at the desired adjusted level of the cutter box. The pawl may be facilely released from the ratchet wheel to permit the cutter box to be lowered. From the above it will be apparent that the rotation of the hand wheel 302 will be effective correspondingly to drive chains 296 and 282 and thereby adjust the level of the cutter box interposed as a link of chain 282. The weight of the cutter box and devices carried thereby is counterbalanced by spring 310 fitted over shaft 276 (FIGS. 3 and 4), one end of said spring being anchored to said shaft as indicated at 312 with the opposite looped end 314 of said spring engaged over member 22. On lowering and raising the cutter box the counterbalance spring winds and unwinds, respectively, whereby the cutter box may be effortlessly raised and lowered.

At the opposite side of the cutter box (FIG. 18), take-up mechanism 316 is provided comprising a chain 318 anchored at one end at point 320 of its companion bracket 266 with the opposite end of the chain being anchored to the frame 20 at anchor point 322. The chain 318 is trained over sprocket 324 keyed to shaft 276, idler sprocket 326 carried by stub shaft 328 mounted in frame 20, and sprocket 330 carried by the forked fitting 332 connected to the frame through the intermediation of spring 334. Proper tension is thus applied to chain 318 by the spring actuated sprocket 330. In this instant embodiment the mounting brackets 266 are of cast metallic construction and include mounting flange parts 336 and 338 (FIG. 4) which interfit with the walls 340 and 342, respectively, of the cutter box.

Mounted on one side of the flange part 336 of each bracket 266 by fasteners 343 (FIGS. 1 and 6) is a guide plate 344 having a longitudinal cutout 346 to receive an adjacent leg 348 of a companion channel member 258 with slight clearance, the plates 344 thereby riding along members 258 and guiding the vertical movement of the cutter box with the rollers 270 properly oriented for movement along members 258 (FIGS. 5 and 6). The cutter box 262 is provided with end plates 350 and 352 and hingedly mounted on end plate 352 by means of hinge 354 is cutter box door 356. The hingedly mounted door extends the major portion of the length of the cutter box and a fixed section 356' defines a continuation of the door, being aligned therewith, and extends along the remaining length of the cutter box. The door section 356' is secured to the cutter box by fasteners 358, there being spacers 360 positioned on the fasteners and interposed between the door section and cutter box. A narrow gap or parting space 362 is defined between confronting edges 364 and 366 of the door 356 and sectin 356', respectively. The door is pivotally movable in a narrow arc between the closed position shown in solid lines in FIG. 5 and the open position 356'' shown in broken lines in said figure. The door is opened to facilitate the threading of the fabric through the cutter box. The door is releasably latched in the closed position by the interengageable latch members 368 and 370 mounted on section 356' and door 356, respectively. The latch member 368 is pivotally mounted in a bifurcated bracket 372 by pivot pin 374, the bracket being suitably secured to section 356', as, for instance, by a fastener 358. The latch member 368 is of plate-like construction having a latch part 376 at one end and a vertically disposed handle part 378 at the opposite end. The latch member 370 is of plate-like construction with an angularly disposed latch part 380 engaged with companion latch part 376, the latch member being secured to the door by fasteners 382. Thus the latching and unlatching of the door is under the control of handle part 378. Projecting from the cutter box are a pair of guide rods 384, 384' which extend through companion apertures 386 provided in the region of the free end of the door, the rod 384' having a spring 388 thereon disposed between the cutter box and door and which is compressed on the closing of the door. The opening movement of the door is limited by the nut 390 threaded on the outer end of rod 384'. Depending from the door 356 is a length of chain 392 which gauges the height of the cutting box with respect to the superposed layers of cloth on the table.

With reference to FIGS. 11 and 12, a narrow vertically disposed longitudinally extending cloth channel or slot 394 is defined between the confronting walls 396 and 398 of the cutter box and door, respectively, said channel being in vertical alignment with the forward edge of the feed roll 78 (see FIG. 1). A converging entrance to the channel is provided by the inclined wall portions 400 and 402 of the cutter box and door, respectively. The door is provided with a longitudinally extending U-shaped part 404 defining a slot 406 to receive the circular cutting disc 408 of the assembly 264. The cutter box and door are of light metallic material extruded or otherwise extended to the shape shown in FIG. 11, the cutter box being longitudinally rigidified to resist distortion and the tendency of downward flexing as the cutter assembly 264 travels therealong. The cutter box suspends the cutter assembly for travel therealong and it has been found that this arrangement obviates the downward flexing problem and problems attendant thereto notwithstanding the light weight construction of the cutter box. The cutter box is generally of inverted U-shaped construction having opposite side walls 342, 396 and 400 and a connecting base wall 340 which defines the top wall of the cutter box. The opposite side walls have aligned inturned portions 414 and 414', the portion 414 defining a track 415 at one side of the box, with the opposite track 417 being defined on the longitudinal rib 416 formed extending inwardly of wall 396. The rib 416 is disposed substantially midway of wall 396 and is grooved to define track 417, the rib serving also to rigidify the cutter box longitudinally against downward flexing forces. Thus the cutter box is of rigid-ified open box section construction and suspends the cutter assembly 264 for travel therealong in the manner to be described hereinafter.

The cutter assembly comprises a cutter block 418 mounting rollers 420, 422 and 424 (FIGS. 8, 11 and 12) on companion stub shafts 426, the roller 420 riding on track 415, and the rollers 422 and 424 being disposed in horizontal alignment for riding engagement on track 417. The block 418 is provided with a pair of upstanding pins 428 having springs 430 engaged thereon, there being provided a roller assembly 432 engaged on said pins. The roller assembly 432 comprises a vertical plate 434 having horizontally disposed apertured mounting flanges 436 which are engaged on pins 428 to compress the springs 430. Mounted on shaft 438 at the center of plate 434 are a pair of rollers 440, 440' which are disposed on opposite sides of said plate. The rollers 440, 440' are thus biased into engagement with wall 340 by springs 430, the roller assembly 432 thereby biasing the rollers 420, 422 and 424 onto their companion tracks of the cutter box.

Mounted in bearings 442 and 442' is the cutting disc shaft 444 which in turn fixedly mounts gear 446 and mounting plate 448, the latter depending below the cutter box. The mounting plate 448 is circular and mounts rotary cutting disc 408 by means of screws 450, the cutting disc extending across cloth channel 394 into slot 406 of the door. The rotary disc 408 is peripherally sharpened as indicated at 452. The cutter block 418 is formed in two parts 418' and 418'' which separate at parting line 454, said block parts being retained in assembled relation by screws 456. As best shown in FIGS. 10, 11 and 12, the block parts 418' and 418'' are dished out as indicated at 458 and 458', respectively, to receive the mechanism now to be described. Secured to block part 418' is a series of three upstanding pins 460, 462 and 464, the pins 460 and 464 having rotatably mounted thereon similar sprockets 466 and 466', respectively. The pin 462 rotatably mounts unitary assembly 468 consisting of a sprocket 470 similar to sprockets 466, 466', and a gear 472 in mesh with gear 446, the latter being of substantially smaller diameter than gear 472. The similar sprockets 466, 470, and 466' are disposed at a common level in aligned space relation.

The cutter assembly is reciprocated in the cutter box by chain 474 which has its opposite ends anchored to block part 418' at anchor points 476 and 478 (FIG. 8), said ends having fittings 480 threadedly engaged in said block part at said anchor points. The lower run 474' of the chain is trained (FIG. 10) under sprocket 466', over sprocket 470, and under sprocket 466, the chain also being trained around the sprockets 482 and 484 at the opposite ends of the cutter box. The sprocket 482 is motor driven as will be described in detail hereinafter; on the rotation of said sprocket the cutter assembly will be reciprocated with the chain, being in effect a link therein. On cutter assembly movement, the chain will rotate sprockets 466, 470 and 466' to thereby drive the cutting disc through gears 472 and 446, the latter gears providing a speed multiplication to thereby provide high speed cutting disc rotation on cutter assembly reciprocation. Thus the chain reciprocating the cutter assembly in the cutter box drives the cutting disc through speed multiplication gears 472 and 446. The gear 446 and disc 408 rotate in the same direction of rotation as sprockets 466 and 466', the assembly 468 rotating in an opposite direction.

With reference to FIGS. 8 and 17, the sprocket 482 is keyed to the lower end of shaft 486 as indicated at 488, the upper end of said shaft having a worm wheel 490 keyed thereto as indicated at 492. The worm wheel 490 is in mesh with worm 494 which is driven by motor 496 through coupling 498. The worm and worm wheel are enclosed in gear box 500 secured to wall 340 of the cutter box by fasteners 502. The plate 352 is provided with an extension bracket 352' which serves as a mount for motor 496 which is suitably secured thereto. It will be apparent that the motor and its transmission drive to chain 474 are all carried by the cutter box and move therewith as a unitary assembly.

The sprocket 484 is carried in a forked fitting 504 (FIG. 16) carried by shaft 506 which extends through a companion aperture 508 provided in end plate 350, the shaft being threaded and having a nut 510 engaged thereon. The tension of chain 474 may be adjusted by means of nut 510. The sprocket 484 is rotatably mounted on pin 512 carried by fitting 504, said pin depending in longitudinal guide slot 514 of plate 516 which projects laterally from end plate 350. Thus sprocket 484 is positively guided by the coaction between pin 512 and companion slot 514. Bumpers 518 and 520 formed of a suitable resilient material such as rubber, or the like, are suitably secured in position adjacent end plates 350 and 352, respectively, for coaction with bumper parts 522 and 524, respectively, of cutter block 418 at the opposite ends of the path of movement thereof. The end plates 350 and 352 are secured in position at the ends of the cutter box by screws 526 which are received in companion fittings 528 projecting from the end plates.

Selective means are provided for buffering or dressing the cutting edge of the cloth cutting disc during the operation thereof. With reference to FIGS. 9, 10, 12 to 14, and 16, a buffering block 530 is rotatably mounted on stub shaft 432 secured to the cutter block at 534. Depending from the cutter block is an integrally formed stop part 536 which is disposed for coaction with the adjustable screw stop 538 threadedly engaged in portion 540 of block 530. The block 530 is biased into engagement with stop part 536 by spring 542 one end of which is fixed to portion 540 at 544 with the opposite end being fixed to stop part 536 at 546. The adjustment of screw stop 538 adjust the position of the buffering assembly 548 with respect to cutting disc 408. Thus the buffering assembly may be adjusted towards or away from the cutting disc to obtain the requisite amount of overlap of the buffering assembly with respect to the peripheral edge of the cutting disc.

The buffering assembly 548 comprises a U-shaped bracket 550 having a shaft 552 extending between the arms 554 thereof, there being a spaced pair of buffering wheels 556 rotatably mounted on said shaft. The right part 558 of bracket 550 has a laterally projecting shaft 560 which is rotatably mounted in the part 562 of block 530. Thus the buffering assembly is rotatable about the axis disposed at right angles to the pivotal axis of block 530. The buffering assembly is biased in a counterclockwise direction about shaft 560 (FIG. 12) by means of spring 564 one end of which is fixed to bracket 550 at 566 with the opposite end secured to post 568 of block 530. The space between wheels 556 defines a slot 570 for the extension therein of the sharpened peripheral edge of the cutting disc.

In the normal non-buffering position of the buffering assembly, buffering wheels 556 are disposed parallel to the cutting disc and out of contact therewith (FIGS. 12, 13 and 16). The buffering assembly is selectively pivotally movable to displace the same angularly and bring wheels 556 into buffering contact with the cutting disc (FIG. 14). Secured to shaft 560 by means of screw 572 is a latch lever 574 having a cam surface 576 terminating in a hook-shaped portion 578. Companion to latch lever 574 is a lever 580 pivotally mounted upon block 530 at 582. The lower end of lever 580 is provided with a pin 584 to facilitate the manual movement of said lever. In the normal non-buffering position, pin 586 of lever 580 is engaged or latched by portion 578 of lever 574 as shown in solid lines in FIG. 12, lever 580 being pivotally movable in a clockwise direction, viewing said figure, to the broken line position 580' against stop pin 588 to release lever 574 and the buffering assembly for movement to the angularly disposed buffering position. In the buffering position pin 586 of lever 580 will act as a stop to limit the counterclockwise rotation of lever 574. Thus the buffering assembly is movable between buffering and non-buffering positions under the control of lever 580, it being understood that pin 586 rides up cam surface 576 to engage with portion 578 and latch lever 574 in the normal non-buffering position. To effect sharpening or buffering of the cutting disc during the operation thereof it is merely necessary to move pin 584 and with it lever 580 to stop 588, the buffering operation simultaneously buffering both opposite surface portions 590 and 590' of the peripheral sharpened edge portion 452 (FIG. 14).

Secured to block 418 by screws 592 is a switch plate 594 (FIGS. 5, 8 and 11) which actuates micro-switches 596 and 598 suitably secured in corner portions at the opposite ends of the cutter box. Each switch is provided with a depending actuator 600 disposed in the path of movement of switch plate 594. It will be noted that the latter is spaced from block 418 so as to clear roller 420 disposed therebelow.

In FIG. 19 there is shown the wiring diagram of the cutter assembly motor 496 and control circuit therefor. The operation is such as to provide a cutting stroke in either direction of cutter assembly travel. In the home or non-cutting position of the cutter assembly 264, diagrammatically illustrated in FIG. 19, switch 596 is open and switch 598 is closed and said assembly is disposed at the inner end of the cutter box in which position plate 594 maintains switch 596 open. The control circuit includes power supply 602, main switch 604, and reversing switch 606, all circuit interconnected as shown on the diagram of FIG. 19. The switch 606 is of conventional construction and is externally operated by a two-position toggle control, the two positions being "forward" and "reverse" with a built-in neutral provision that prevents manual operation of the switch from one position to the other without first traversing the neutral provision, the latter providing the requisite time-delay in reversing the direction of rotation of the motor. A single stroke of travel of assembly 264 along the length of the cutter box provides for the cutting of the fabric exposed to the action of cutting disc 408 and said stroke may be in either direction of travel of assembly 264. In the assembly position shown in FIG. 19, a cutting stroke is effected by actuating switch 606 to "reverse" position, with the circuit being completed through switch 598 which is closed. At the end of this cutting stroke switch 598 will be automatically opened by the coaction between switch plate 594 and actuator 600 of switch 598 to break the circuit to the motor and stop the assembly thereat with switch 598 open. The next cutting stroke is effected by actuating switch 606 to the "forward" position in which case the circuit is completed through switch 596 which is now closed, the assembly being returned to the FIG. 19 position and automatically stopped thereat. The switches 596 and 598 are thus of the normally closed type, being opened by an associated end of switch plate 594. As aforenoted, the operator cannot actuate switch 606 to reverse the direction of travel of the assembly without traversing the neutral position which provides a time-delay factor.

In operation, with frame 50 in the open fabric threading position as shown in FIGS. 1 and 2, the fabric is draped over roll 58 and is brought into proper side edge adjustment. Thereafter the fabric is removed from roll 58 and is draped over the feed or drive roll 78 and frame 50 is moved to the operating position and latched thereat to achieve the desired fabric wrap-around with respect to feed roll 78. During the threading operation roll 78 is disengaged from its drive shaft 182 by means of knob 222 which is in the "out" position for such disengagement. The fabric is led from the feed roll through the cutter box as aforedescribed. At the end of a lay the fabric may be cut by manipulating switch 606 to effect a cutting stroke of cutter assembly 264. The cutter box may be elevated, as desired or required, by manipulating control wheel 302. It will be understood that during operation, knob 222 will be in the "in" or engaged position so that the feed roll will be positively driven on movement of the machine along the table.

With frame 50 in the open threading position, the feed roll is constructed for easy draping of the fabric thereover, and by the expediency of swinging said frame to the latched closed or operating position, roll 58 is automatically disposed to achieve the desired fabric wraparound with respect to the feed roll.

Many other changes could be effected in the particular constructions, and in the methods of use and construction, and in specific details thereof, hereinbefore set forth, without substantially departing from the invention intended to be defined herein, the specific description being merely of embodiments capable of illustrating certain principles of the invention.

What is claimed as new and useful is:

1. In a spreading machine, cloth cutting apparatus including a longitudinally extending cutter box and a cutter assembly mounted therein for reciprocation therealong, track means defined in said cutter box for guiding the movement of said cutter assembly, the latter including a rotary cutter disc suspended below said cutter box and projecting laterally therebeyond, said cutter box being longitudinally rigidified to resist bending stresses applied thereto on the reciprocation of said cutter assembly, and being cross-sectionally closed except for an open bottom through which said cutter disc projects.

2. In a spreading machine, cloth cutting apparatus including a longitudinally extending cutter box and companion cutter assembly, track means defined in said cutter box for suspending said cutter assembly therein for reciprocation therealong, said cutter box being cross-sectionally closed except for an open bottom section and said track means extending longitudinally of said cutter box and longitudinally rigidifying the same against downward bending stresses applied thereto on the reciprocation of said cutter assembly, the latter having a cutter disc suspended below said cutter box and laterally therebeyond through said open bottom section.

3. In a spreading machine, cloth cutting apparatus including a longitudinally extending cutter box and a companion cutter assembly, said cutter box being of generally inverted U-shaped cross-section having opposite side walls and a connecting top wall, said sidewalls having longitudinally extending tracks projecting inwardly thereof for suspending said cutter assembly in said cutter box for reciprocation therealong, said cutter box being cross-sectionally closed except for an open bottom section and longitudinally rigidified with the aid of said tracks, said cutter assembly having a rotary cutting disc suspended below said cutter box and laterally therebyond through said open bottom section.

4. In a spreading machine, cloth cutting apparatus including a longitudinally extending cutter box and a companion cutter assembly, said cutter box being of generally inverted U-shaped cross-section having opposite side walls and a connecting top wall, said sidewalls having longitudinally extending tracks projecting inwardly thereof for suspending said cutter assembly in said cutter box for reciprocation therealong, said cutter box being cross-sectionally closed except for an open bottom section and longitudinally rigidified with the aid of said tracks, said cutter assembly having a rotary cutting disc suspended below said cutter box and laterally therebyond through said open bottom section, and means for reciprocating said cutter assembly in said cutter box comprising an endless chain having spaced runs with said cutter assembly being linked into one of said runs with the other run being in driving engagement with said cutter disc whereby to drive the latter on the reciprocation of said cutter assembly.

5. In a spreading machine, cloth cutting apparatus including a longitudinally extending cutter box and a cutter assembly mounted therein for reciprocation therealong, said cutter assembly including a rotary cutter disc projecting laterally beyond said cutter box, and means for reciprocating said cutter assembly in said cutter box comprising an endless chain having spaced runs with said cutter assembly being linked into one of said runs with the other run being in driving engagement with said cutter disc through the intermediation of speed multiplication means whereby to drive said cutter disc at high speed on the reciprocation of said cutter assembly in said cutter box.

6. In a spreading machine, cloth cutting apparatus including a longitudinally extending cutter box and a cutter assembly mounted therein for reciprocation therealong, said cutter assembly including a rotary cutter disc projecting laterally beyond said cutter box, and means for reciprocating said cutter assembly in said cutter box comprising an endless chain having spaced runs with said cutter assembly being linked into one of said runs with the other run being in driving engagement with said cutter disc through the intermediation of speed multiplication means whereby to drive said cutter disc at high speed on the reciprocation of said cutter assembly in said cutter box, a shaft mounting said cutter disc, and another shaft mounting means in driving engagement with said other run of the chain, said speed multiplication means comprising gearing operatively connected between said shafts.

7. In a spreading machine, cloth cutting apparatus including a longitudinally extending cutter box and a cutter assembly mounted therein for reciprocation therealong, track means defined in said cutter box for guiding the movement of said cutter assembly, the latter including a rotary cutter disc suspended below said cutter box and projecting laterally therebeyond, and means for reciprocating said cutter assembly in said cutter box comprising an endless chain having spaced runs with said cutter assembly being linked into one of said runs with the other run being in driving engagement with said cutter disc through the intermediation of speed multiplilcation means whereby to drive said cutter disc at high speed on the reciprocation of said cutter assembly in said cutter box.

8. In a spreading machine, cloth cutting apparatus including a longitudinally extending cutter box and a cutter assembly mounted therein for reciprocation therealong, track means defined in said cutter box for guiding the movement of said cutter assembly, the latter including a rotary cutter disc suspended below said cutter box and projecting laterally therebeyond, and means for reciprocating said cutter assembly in said cutter box comprising an endless chain having spaced runs with said cutter assembly being linked into one of said runs with the other run being in driving engagement with said cutter disc, a shaft mounting said cutter disc, and another shaft mounting a sprocket in driving engagement with said other run, and speed multiplication gearing operatively connected between said shafts whereby to drive said cutter disc at high speed on the reciprocation of said cutter assembly in said box.

9. In a spreading machine, cloth cutting apparatus including a longitudinally extending cutter box and a cutter assembly mounted therein for reciprocation therealong, track means defined in said cutter box for guiding the movement of said cutter assembly, the latter including a rotary cutter disc suspended below said cutter box and projecting laterally therebeyond, means for reciprocating said cutter assembly in said cutter box comprising an endless chain having spaced runs with said cutter assembly being linked into one of said runs with the other run being in driving engagement with said cutter disc, and means carried by said cutter assembly selectively engageable with said cutter disc for buffering the same on the reciprocation of said cutter assembly.

10. In a spreading machine, cloth cutting apparatus including a longitudinally extending cutter box and a cutter assembly mounted therein for reciprocation therealong, said cutter assembly including a rotary cutter disc projecting laterally beyond said cutter box, and means for reciprocating said cutter assembly in said cutter box comprising an endless chain having spaced runs with said cutter assembly being linked into one of said runs with the other run being in driving engagement with said cutter disc through the intermediation of speed multiplication means whereby to drive said cutter disc at high speed on the reciprocation of said cutter assembly in said cutter box, a motor for driving said chain, and a control circuit therefor including a reversing switch, and normally closed limit switches disposed at the opposite terminal ends of said cutter box, switch plate means carried by said cutter assembly disposed to actuate a corresponding limit switch at the terminus of each reciprocating stroke of the cutter assembly to open said control circuit to the motor, the actuation of said reversing switch being effective to energize said control circuit to the motor through the opposite closed limit switch to reciprocate said cutter assembly to the opposite terminus.

11. In a spreading machine, cloth cutting apparatus including a longitudinally extending cutter box and a cutter assembly mounted therein for reciprocation therealong, said cutter assembly including a rotary cutter disc projecting laterally beyond said cutter box, and means for reciprocating said cutter assembly in said cutter box comprising an endless chain, a motor for driving said chain, and a control circuit therefor including a reversing switch, and normally closed limit switches disposed at the opposite terminal ends of said cutter box, switch plate means carried by said cutter assembly disposed to actuate a corresponding limit switch at the terminus of each reciprocating stroke of the cutter assembly to open said control circuit to the motor, the actuation of said reversing switch being effective to energize said control circuit to the motor through the opposite closed limit switch to reciprocate said cutter assembly to the opposite terminus.

12. In a cloth spreading machine for spreading cloth on a surface, cloth cutting apparatus for cutting the cloth and including a cutter box extending substantially the width of the machine, the box being positioned above the surface, the cutter box providing an elongated housing substantially completely enclosed with the exception of an opening in one wall, the opening extending substantially the entire length of the housing, flanges forming a pair of tracks disposed on opposite sides of the opening and paralleling the opening, and a carrier movable along the tracks within the box and supporting a cutter assembly, the cutter assembly including a rotary cutting disc below the carrier and positioned outside the box.

13. In a cloth spreading machine for spreading cloth on a surface, cloth cutting apparatus for cutting the cloth and including a cutter box extending substantially the width of the machine, the box being positioned above the surface, the cutter box providing an elongated housing substantially completely enclosed with the exception of an opening in one wall, the opening extending substantially the entire length of the housing, flanges forming a pair of tracks disposed on opposite sides of the opening and paralleling the opening, and a carrier movable along and having a three point support on the tracks, the carrier supporting a cutter assembly, the cutter assembly including a rotary cutting disc below the carrier and positioned outside the box.

14. In a cloth spreading machine for spreading cloth on a surface, cloth cutting apparatus for cutting the cloth and including a cutter box extending substantially the width of the machine, the box being positioned above the surface, the cutter box providing an elongated housing substantially completely enclosed by a top wall and side walls and having an open bottom, the open bottom extending substantially the entire length of the housing, flanges forming a pair of tracks disposed on and extending inwardly from opposed side walls at opposite sides of the open bottom and paralleling the open bottom, and a carrier movable along the tracks within the box and supporting a cutter assembly, the cutter assembly including a rotary cutting disc below the carrier and positioned outside the box.

15. In a cloth spreading machine for spreading cloth on a surface, cloth cutting apparatus for cutting the cloth and including a cutter box of channel form extending substantially the width of the machine, the box being positioned above the surface, the channel being positioned to provide an elongated housing substantially completely enclosed with the exception of a bottom opening extending substantially the entire length of the housing, flanges forming a pair of tracks disposed on and extending inwardly from opposed side walls of the channel and paralleling the opening, and a carrier movable along the tracks within the box and supporting a cutter assembly, the cutter assembly having means extending outside the box and supporting a rotary cutting disc positioned outside the box.

References Cited by the Examiner
UNITED STATES PATENTS

| | | | |
|---|---|---|---|
| 1,048,875 | 12/1912 | Rader | 83—488 |
| 1,328,039 | 1/1920 | Essner | 83—488 |
| 1,730,560 | 10/1929 | Castricum | 83—488 X |
| 1,812,406 | 6/1931 | Jenkins | 83—488 X |
| 2,297,468 | 9/1942 | Graupner | 83—174 |
| 2,695,667 | 11/1954 | Carroll | 83—614 X |
| 2,708,969 | 5/1955 | Kopelowicz | 83—174 |
| 2,727,571 | 12/1955 | Sayles | 83—488 X |
| 2,777,521 | 1/1957 | Tanis | 83—488 X |
| 2,846,005 | 8/1958 | Wilson | 83—488 X |
| 2,921,492 | 1/1960 | Worth | 83—488 X |

WILLIAM W. DYER, Jr., *Primary Examiner.*

ANDREW R. JUHASZ, *Examiner.*